June 15, 1937.  E. F. GUBA  2,083,950
METHOD AND APPARATUS FOR VAPORIZING SULPHUR AND
OTHER FUNGICIDAL AND INSECTICIDAL SUBSTANCES
Filed Feb. 19, 1934
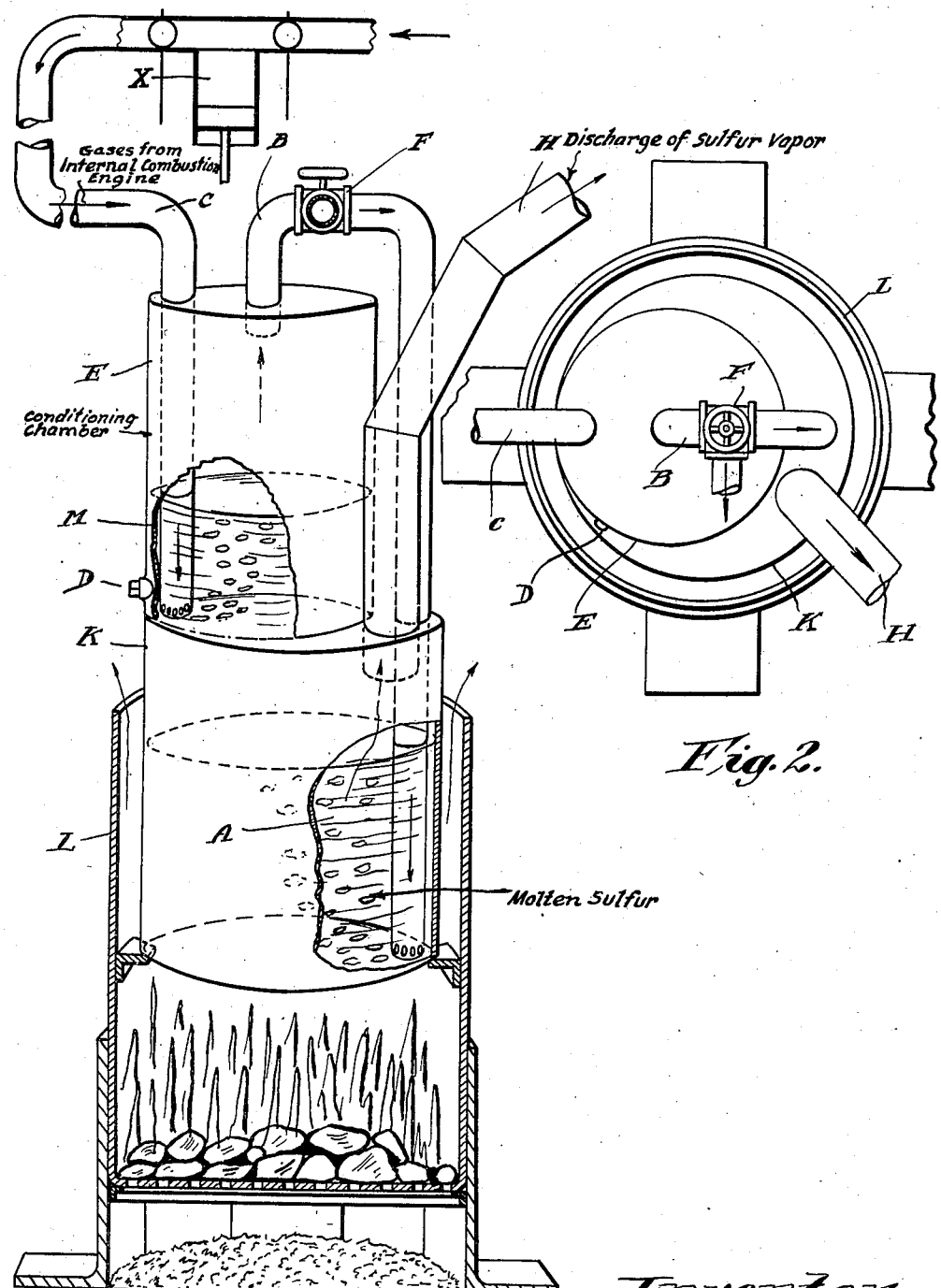
Inventor
Emil Frederick Guba Patented June 15, 1937

2,083,950

UNITED STATES PATENT OFFICE 2,083,950

METHOD AND APPARATUS FOR VAPORIZING SULPHUR AND OTHER FUNGICIDAL AND INSECTICIDAL SUBSTANCES

Emil Frederick Guba, Waltham, Mass.

Application February 19, 1934, Serial No. 711,998

3 Claims. (Cl. 21—58)

This invention relates to a method and apparatus for vaporizing sulphur more especially for the control of diseases and insect pests of greenhouse crop plants. The invention has its particular utility in greenhouses, but it will be understood that there are many other uses to which it may be applied without departing from the essentials of the invention as hereinafter disclosed.

Sulphur is recognized as a fungicide and insecticide. Its efficiency as such varies according to the form in which sulphur is used and means of application. Vaporized sulphur is unequalled as a fungicide due to its extreme fineness, even distribution in the treated area, great adhesion to plant foliage and contacted surfaces whether animate or inanimate, and to its volatile principle which is fuming elemental sulphur and not, as with other sulphur fungicides, hydrogen sulphide. Research in greenhouse crop prophylaxis has shown that fungous diseases which are controllable with present forms of sulphur or copper fungicides yield still better to sulphur vapors, notable examples being the powdery mildews of cucumber, rose, sweet pea, etc. caused respectively by the fungi *Erysiphe cichoracearum* DC., *Sphaerotheca pannosa* (Wallr.) Lev., *Erysiphe polygoni* DC., etc. and the rust diseases of carnation and snapdragon caused respectively by the fungi *Uromyces caryophyllinus* (Schr.) Wint., and *Puccinia antirrhini* D. & H., and that certain fungous parasites which cannot be controlled successfully with present forms of sulphur or copper fungicides are readily controlled with sulphur vapors, notable examples being the leaf mould disease of tomato caused by the fungus *Cladosporium fulvum* Cke., black spot of rose caused by the fungus *Diplocarpon rosae* Wolf and the downy mildew of cucumber caused by the fungus *Peronoplasmopara cubensis* (B. & C.) Clint. The merit of vaporized sulphur as an insecticide is equal if not superior to hydrocyanic acid gas in combating the greenhouse white fly (*Trialeurodes vaporariorum* Westw.). Vaporized sulphur is of great value in preventing infestations of the common and destructive greenhouse red spider mite *Tetranychus bimaculatus* L. and other insect pests of greenhouse crop plants.

From the beginning of greenhouse plant culture sulphur vapors have been generated by applying sulphur to the greenhouse heating surfaces, more particularly to the steam pipes. In view of the primitive methods employed and the small amount of vapors which could be generated in this manner, successful results in crop prophylaxis were not always obtained. In the warmer months of the year when heat is not employed in the greenhouse, the method cannot be practiced. More recently apparatus consisting of a heater and sulphur vessel has been used as well as diverse manufactured devices and modifications of such, none of which operate free of the hazard of sulphur combustion or are really practical for charging large greenhouses with sulphur vapors. Similar practical difficulties and dangers are encountered in the present methods of vaporizing naphthalene, nicotine, pyrethreum, etc., in greenhouse use.

Thus, my invention which is not limited to the vaporization of sulphur provides both method and apparatus for the vaporization of sulphur for fungicidal and insecticidal purposes and for rodent control, wherein use is made of the warm exhaust gases from an automobile or any fuel combustion engine or gases in portable cylinders under pressure which are initially free of oxygen and inert to sulphur and conducting them into molten sulphur contained in an enclosed vessel in which the sulphur is heated over a fuel flame or charcoal furnace. The apparatus provides against all danger of sulphur ignition by using said inert oxygen-free gases. It generates dense clouds of sulphur vapors by furiously bubbling these gases through molten sulphur and driving the vapors into the greenhouse atmosphere through a suitable tube. It will be understood that when the point of delivery from tubes into atmosphere has been reached, the gases have become too cool for ignition of the mixture to occur in atmosphere at room temperature. The method provides further a chamber, intercepting the flow of gases into the molten sulphur, to modify and equalize the pulsating pace of outflow, and otherwise to condition the gases for service as a distributing vehicle by providing what amounts to a filter for solid products of combustion and moisture present in the exhaust gases and for the absorption or oxidation of any gases dangerous to humans particularly carbon monoxide, excepting when this gas is needed in uses of the apparatus for filling burrows to effectually exterminate rodents. The apparatus further provides for a by-pass valve in the gas line to regulate the flow of inert gases into the molten sulphur and to govern the discharge of sulphur vapors. The method provides in addition to the generation of insecticidal and fungicidal vapors the enrichment of greenhouse atmospheres with carbon dioxide, which is a component of the exhaust gases of fuel combustion engines and the addition of which to greenhouse atmospheres is a distinct aid to plant vigor and increased crop yields. This idea contributes to the merit of my invention.

It is thus clear that my invention provides for the use of carbon dioxide in the exhaust gases of a fuel combustion engine, at the same time utilizes said gases for the vaporization of a chemical such as sulphur, naphthalene, etc.

Further objects and advantages of the invention will be apparent as it is better understood by reference to the following specification and accompanying drawing in which Fig. 1 is a longitudinal section somewhat diagrammatic, through an apparatus embodying the invention; Fig. 2 is a plan view thereof.

Referring to the drawing (Figs. 1 and 2), the invention operates as follows: the exhaust gas from an automotive or fuel combustion engine represented conventionally at (X) in Figure 1 is conducted through a suitable tube (C) into the enclosed chamber (E), which is heated and maintained hot by resting on the hot sulphur container (K) and by having its side walls surrounded by the hot gases that rise around the sulphur container and around it from the fire beneath. The chamber (E), herein called a "conditioning chamber", constitutes an enlargement of the gas flow passage, and is capable of holding a liquid. In consequence the pace of flow of exhaust gases is here modified, as regards the explosive pulsations which become reduced, while gas in the valleys of pressure between pulsations becomes compressed, and the whole more or less equalized in pressure. As the pace of flow is slowed through the chamber, and its direction abruptly changed, solid products of combustion and moisture are collected and carbon monoxide is absorbed or oxidized with chemicals (M). The chamber (E) is provided with a drain (D). Thereafter said gases are conveyed through a suitable tube (B) where they may either be by-passed into the open atmosphere or directed into the molten sulphur (A) by the valve (F). On being conducted into the molten sulphur (A) furious bubbling of the sulphur takes place, driving off clouds of sulphur vapors which are discharged through a suitable flexible tube (H) into the greenhouse atmosphere. The arrow indicates the course of the gases. The rate of discharge of the sulphur vapors is further subject to control by the speed of operation of the fuel combustion engine. The enclosed vessel (K) containing the sulphur (A) is placed over a heater (L) to melt the sulphur and to maintain its molten state. I prefer to use charcoal fuel because it is most practical. Both the sulphur container (K) and the gas absorbing or filtering chamber (E) are completely closed except for means of inlet and outlet for gases (C, B, and H) thus insuring against the entrance of air and the consequent combustion of sulphur and the production of sulphur dioxide which is extremely fatal to plant life.

Various changes may be made in the construction of the apparatus without departing from the invention or sacrificing any of the advantages thereof. The apparatus involves a simple construction of any magnitude which can easily be operated, a matter of great practical importance in horticulture and agriculture. In accordance with the invention the apparatus has been found very successful in combating greenhouse crop parasites, but the invention may readily be also adapted to use in vineyards, orchards, truck farms, grain fields, cranberry bogs, etc. where the principle as set forth in these specifications is practical, namely, of conducting the inert exhaust gases from the motor engine into hot molten sulphur, naphthalene, nicotine, etc.

Having now particularly described and ascertained the nature of my invention and the manner same is to be used, I claim as new and useful:

1. A method, for the distributing in atmosphere of sulphur, which comprises the conducting of inert gases from the exhaust of an internal combustion engine and the discharging of those gases below the surface of a molten body of sulphur which is to be distributed, and letting them bubble to the surface; said sulphur being maintained molten by an independent source of heat and being held closed from contact with all gases which come from a seat of combustion at the said source of heat; said sulphur being also held closed to ingress of atmosphere; followed by the conducting of said bubbled inert gases, with their entrained particles of the sulphur, to that atmosphere where the distributing is to occur.

2. Apparatus for distributing sulphur in atmosphere comprising a container for holding a supply of said sulphur; said container being closed to ingress of atmosphere; a furnace exterior to the container for applying heat to maintain the sulphur in a molten state, the gases from the place of combustion in said furnace being released to atmosphere without contact with said sulphur; an internal combustion engine; a conduit from the exhaust of the engine to a place below the surface of said molten sulphur for discharge there of the gases exhausted from the engine; there being in said container a space above the sulphur for collection of said discharged inert gases as they bubble to the surface of the sulphur; and a conduit from said collecting space, for conducting said inert gases, with entrained particles of the sulphur, to that atmosphere where the distribution is to occur.

3. Apparatus for distributing in atmosphere sulphur and other solid fungicidal and insecticidal substances, comprising a closed container for holding a supply of said substance in a molten state; a furnace for heating said container by applying heat to the outside of walls thereof, the container being closed against ingress of products of combustion of the furnace; an internal combustion engine having a conduit from its exhaust passage into said container, to within the location of the said substance; a discharge port from the container, above the location of said substance therein; and a conduit thence to atmosphere for the flowing and cooling of matter issuing from the port; said conduit for the exhaust gases to the said closed container including a hot chamber, for conditioning the exhaust gases prior to their delivery to the said location of the molten substance, and in which there is a jacket around the closed container constituting a passage for escaping products of combustion of the furnace; and in which the hot conditioning chamber is mounted on the closed container and has its walls bathed by the furnace products issuing from said jacket.

EMIL FREDERICK GUBA.